United States Patent [19]

Chianelli et al.

[11] 4,368,115
[45] Jan. 11, 1983

[54] CATALYSTS COMPRISING LAYERED CHALCOGENIDES OF GROUP IVB-GROUP VIIB PREPARED BY A LOW TEMPERATURE NONAQUEOUS PRECIPITATE TECHNIQUE

[75] Inventors: Russell R. Chianelli, North Branch; Theresa A. Pecoraro, Middletown, both of N.J.; Martin B. Dines, Santa Ana, Calif.

[73] Assignee: Exxon Research and Engineering Co., Florham Park, N.J.

[21] Appl. No.: 242,640

[22] Filed: Mar. 11, 1981

Related U.S. Application Data

[63] Continuation of Ser. No. 973,715, Dec. 26, 1978, abandoned, which is a continuation of Ser. No. 797,012, May 16, 1977, abandoned.

[51] Int. Cl.³ .............................................. C10G 45/08
[52] U.S. Cl. ................................... 208/215; 208/145; 208/216 R; 208/254 H; 252/439
[58] Field of Search .................... 208/215, 145, 254 H

[56] References Cited

U.S. PATENT DOCUMENTS

| | | | |
|---|---|---|---|
| 1,948,408 | 2/1934 | Watts et al. | 208/143 X |
| 2,145,657 | 1/1939 | Ipatieff et al. | 208/215 |
| 2,654,696 | 10/1953 | LaPorte | 208/295 |
| 3,140,994 | 7/1964 | Derr et al. | 208/254 H |
| 3,165,463 | 1/1965 | Gleim et al. | 208/264 |
| 3,248,318 | 4/1966 | White | 208/111 |
| 3,252,894 | 5/1966 | Gatsis et al. | 208/264 |
| 3,291,720 | 12/1966 | DoBres et al. | 208/89 |
| 3,598,725 | 8/1971 | Hilfman | 208/216 |
| 3,694,350 | 9/1972 | Wennerberg | 208/212 |
| 4,055,630 | 10/1977 | McCoy et al. | 423/509 |
| 4,192,735 | 3/1980 | Aldridge et al. | 208/112 |
| 4,299,892 | 11/1981 | Dines et al. | 423/508 X |
| 4,323,480 | 4/1982 | Dines et al. | 252/439 |

FOREIGN PATENT DOCUMENTS 1011696 12/1965 United Kingdom.
1418942 12/1975 United Kingdom.

OTHER PUBLICATIONS

Weisser & Landa, "Sulphide Catalysts", *Pergamon Press*, 1973, English Trans. by Ota Sofr, p. 506.
"Mangan", Gmelin Handbuch der Anorganischen Chemie, Teil C6, System Nummer 56, Springer-Verlag, New York, 1976, pp. 4-5.

*Primary Examiner*—Delbert E. Gantz
*Assistant Examiner*—G. E. Schmitkons
*Attorney, Agent, or Firm*—Joseph J. Allocca

[57] ABSTRACT

In processes for the catalytic treatment of hydrocarbon feedstream containing organic sulfur comprising contacting said feedstream with a catalyst for a time at a temperature and pressure sufficient to effect the desired catalytic change on the feedstream, the improvement comprising using as the catalyst a layered composition of the formula $MX_y$ wherein M is a transition metal selected from the group consisting of Group IVb, Vb, VIb, VIIb and uranium, X is a chalcogen selected from the group consisting of sulfur, selenium, tellurium, and mixtures thereof, y is a number ranging from about 1.5 to about 3. The catalyst is prepared by reacting neat or in the presence of a nonaqueous solvent a Group IVb to VIIb or uranium metal salt, and a source of sulfide, selenide or telluride ions, and mixing the reactants at temperatures below 400° C. and at atmospheric pressures. The catalyst may be isolated by filtration and washing with excess solvent (when one is used) or by vacuum pumping any volatile coproduced anion salt. Preferably the chalcogenide is sulfur and y is about 1.5 to about 2.

The catalytic processes which are benefited by the use therein of the above-described compositions are hydrodesulfurization, hydrodenitrogenation, hydroconversion and hydrogenation run in the presence of hydrogen or a hydrogen donor solvent.

85 Claims, No Drawings

CATALYSTS COMPRISING LAYERED CHALCOGENIDES OF GROUP IVB-GROUP VIIB PREPARED BY A LOW TEMPERATURE NONAQUEOUS PRECIPITATE TECHNIQUE

This is a continuation, of application Ser. No. 973,715, filed Dec. 26, 1978 which is a Rule 60 Continuation of Ser. No. 797,012 filed May 16, 1977, both abandoned.

BRIEF DESCRIPTION OF THE INVENTION

An improved process is described for the catalytic treatment of hydrocarbon feedstream containing organic sulfur such as coal liquefaction products and heavy resid oils which comprises contacting said feedstream hydrogen with a catalyst at a temperature and hydrogen pressure and for a time sufficient to effect the desired change in the feed, the improvement comprising using as the catalyst a layered composition of the formula $MX_y$ wherein M is a transition metal selected from the group consisting of Group IVb, Vb, VIb, VIIb and uranium, X is a chalcogen selected from the group consisting of sulfur, selenium, tellurium and mixtures thereof, preferably sulfur and selenium, most preferably sulfur, Y is a number ranging from about 1.5 to about 3. The catalytic materials have a crystalline size of about 50 A × 100 A or less and a particle size of 0.1 micron or less, preferably 0.05 micron or less. The catalyst is prepared by reacting neat or in the presence of an added nonaqueous solvent, the desired Group IVb to VIIb metal salt or salts, the anion, of the salt preferably selected from the group consisting of halide (preferably chloride), acetate, carboxylate, nitrate and sulfate and a source of sulfide, selenide or telluride ions, said source being selected from the group consisting of $Li_2X$, $Na_2X$, $K_2X$, NaHX, LiHX, $NH_4HX$, KHX, $(NH_4)_2X$, $(RNH_3)_2X$, $(RR'NH_2)_2X$, $(RR'R''NH)_2X$ wherein R, R' and R'' are the same or different $C_1$–$C_{20}$ alkyl, $C_6$–$C_{20}$ aryl, preferably $C_1$–$C_8$ alkyl, $C_6$–$C_{12}$ aryl and X is a chalcogen selected from the group consisting of sulfur, selenium, tellurium and mixtures thereof, preferably sulfur and selenium, most preferably sulfur. The nonaqueous solvent (if one is used) is selected from the group consisting of ethers having 4–8 carbons, acetonitrile, benzonitrile, pyridine, propionitrile, N-methylformamide, dimethylformamide (DMF), 1,2-dimethoxyethane (DME), propylene carbonate, ammonia, $C_6$–$C_{20}$ aromatics, molten sulfur, sulfur dioxide, diglyme, ethylacetate, esters of from $C_4$ to $C_1$, sulfolane, dimethylsulfite, tributylphosphate, $C_1$–$C_{30}$ amines, $C_5$–$C_{12}$ alkanes, anhydrous acids, alkylhalides of from 1–20 carbons and aryl halides of from 6–20 carbons wherein the halide is selected from the group consisting of Cl, Br and I, and the hydrocarbon feed to be catalytically treated. The catalyst is prepared spontaneously upon mixing the reactant at temperatures below 400° C. and at atmospheric pressures. The catalyst may be isolated by filtration and washing with excess solvent (when one is used) or by vacuum pumping any volatile coproduced anion salt. Preferably the chalcogen is sulfur and y is 2.

The catalytic material can be prepared outside the catalytic reactor or it can be prepared in the reactor itself by the introduction of the appropriate, desired starting materials (as outlined above) into the reactor using the hydrocarbon feed as the nonaqueous solvent.

The catalytic processes which are benefited by the use therein of the above-described compositions are hydrodesulfurization, hydrodenitrogenation, hydroconversion and hydrogenation.

Typically, the catalytic processes are run at temperatures ranging from ambient to 500° C., preferably 100°–450° C., most preferably 200°–400° C. at pressures of from 1 atm to 5000 psig $H_2$, preferably 100 to 2000 psig $H_2$ and at space velocities of 0.1→10 V/V/Hr, preferably 0.1→5 V/V/hr.

Petroleum crude oils and especially the heavy residuals and shale oil and tar sand oils derived therefrom contain sulfurous compound in large quantities. The liquefaction products obtained from coal also contain considerable quantities of organic sulfur compound. Typically sulfur content for the various hydrocarbon feedstreams is in the range of from about 1 to about 6 percent. Because of the deleterious effects sulfur compounds have on the environment it is necessary to remove most, if not all of the organic sulfur from the hydrocarbons before these hydrocarbons are useable as fuels. Consequently, new and improved processes and catalysts for effecting this removal are constantly being sought.

In the past transition metals of from Group IVb to VII have been used to effect this hydrodesulfurization. Such metals, however, quickly deactivate. To overcome this, metal sulfides have been utilized as HDS catalysts.

The literature is repleat with descriptions of hydrogenation and hydrodesulfurization processes utilizing sulfided IVb to VIIb metals in supported and unsupported condition. See for instance, U.S. Pat. No. 1,932,369; 3,694,350. U.S. Pat. No. 3,840,473 describe a hydrodesulfurization process using phosphate-free catalysts of Group VI and/or Group VIII metals, their oxides or sulfides on a nonzeolite carrier, with addition of 1–10 wt. % Group IVb metal (Ti, Zr, or Ag) as promoter.

U.S. Pat. No. 2,835,349 to Hansford describes a process for hydrocracking and desulfurizing a mineral oil feedstock containing at least about 0.1% S which comprises contacting the feedstock with a catalyst in the absence of $H_2O$ and $O_2$ but with about 1000 to 10,000 SCF of $H_2$/barrel of feed wherein the catalyst comprises a major portion of an adsorbent acidic oxide carrier having cracking activities and a minor portion of chromium sulfide at temperatures, pressures and space velocities sufficient to effect the conversion. The chromium sulfide is prepared by the reduction of chromium sulfate which has been deposited in the carrier from aqueous solution.

U.S. Pat. No. 2,531,767 to Chenicek teaches the use of Mo sulfide as HDS catalyst.

G.B. Pat. No. 362,354 describes a desulfurization process using rhenium or compounds thereof brought in colloidal form onto suitable carriers together with other metals or compounds. In an example a catalytic mass consisting of molybdenum oxide in carbon and rhenium sulfide ($ReS_2$) in carbon was used to desulfurize a light Venezuelan motor cylinder oil containing 0.41% S. The end product obtained contained 0.16% S.

It has been discovered, and forms the basis of this disclosure, that catalytic process and hydrodesulfurization processes in particular, utilizing catalysts can be improved in terms of activity, and selectively by using as a catalyst a layered composition of the formula $MX_y$ wherein M is a transition metal selected from the group consisting of Groups IVb, Vb, VIb, VIIb, and uranium, X is a chalcogen selected from the group consisting of sulfur, selenium, tellurium and mixtures thereof, preferably sulfur and selenium, most preferably sulfur, and y is a number ranging from about 1.5 to about 3.0 which catalyst is prepared by reacting neat or in the presence of an added nonaqueous solvent a Group IVb to VIIb or uranium metal salt, the anion of the salt typically being selected from the group consisting of halide (preferably chloride, bromide and iodide), acetate, carboxylate, perfluorocarboxylate, acetylacetonate, hexafluoroacetonate, sulfate and nitrate and a source of sulfide, selenide or telluride ion, said source being selected from the group consisting of $Li_2X$, $Na_2X$, $K_2X$, NaHX, LiHX, KHX, $NH_4HX$, $(NH_4)_2X$, $(RNH_3)_2X$, $(RR'NH_2)_2X$, $(RR'R''NH)_2X$ wherein R, R' and R'' are the same or different $C_1$–$C_{20}$ alkyl, $C_6$–$C_{20}$ aryl, preferably $C_1$–$C_8$ alkyl, $C_6$–$C_{12}$ aryl and X is a chalcogen selected from the group consisting of sulfur, selenium, tellurium and mixtures thereof, preferably sulfur and selenium, most preferably sulfur. The nonaqueous solvent (if one is used) is selected from the group consisting of $C_4$–$C_8$ ethers, acetonitrile, benzonitrile, pyridine, propionitrile, N-methylformamide, dimethylformamide (DMF), 1,2-dimethoxyethane (DME), propylene carbonate, ammonia, $C_6$–$C_{20}$ aromatics, molten sulfur, sulfur dioxide, diglyme, ethylacetate, $C_4$–$C_1$ esters, sulfolane, dimethylsulfite, tributylphosphate, $C_1$–$C_{30}$ amines, $C_1$–$C_{12}$ alkanes, anhydrous acids, $C_1$–$C_{20}$ alkyl halides and $C_6$–$C_{20}$ arylhalides wherein the halide is selected from the group consisting of Cl, Br and I and the hydrocarbon feedstream to be catalytically treated. Solvents of choice include tetrahydrofuran (THF), dimethylformamide (DMF), chlorobenzene, chloroform, pyridine, acetone and propylene carbonate. The catalyst is prepared spontaneously upon mixing the reactants at temperatures below 400° C. (but greater than about −78° C.), the temperature selected being such that the reactants remain in the liquid state, i.e. above the freezing point but below the vaporization point and at atmospheric pressure. The catalyst may be isolated by filtration and washing with excess solvent (when a solvent is used) or by vacuum pumping any volatile coproduced anion salt.

The catalytic material can be prepared outside the catalytic reactor or it can be prepared in the reactor itself by the introduction of the appropriate, desired starting materials (as outlined above) into the reactor using the hydrocarbon feed as the nonaqueous solvent.

The catalytic processes which are benefited by the use therein of the above-described compositions are hydrodesulfurization, hydrodenitrogenation, hydroconversion and hydrogenation.

Typically, a metal salt of the transition metal such as $TiCl_4$ is reacted with a nonaqueous solution of, or a slurry of a convenient sulfide, selenide or telluride ion source such as $Li_2S$, hydrosulfide salt (i.e. LiHS, $NH_4HS$, KHS, NaHS), $(NH_4)_2S$, $Na_2S$, $K_2S$ $(RNH_3)_2S$, $(RR'NH_2)_2S$, $(RR'R''NH)_2S$ wherein R, R' and R'' are the same or different $C_1$–$C_{20}$ alkyl or $C_6$–$C_{20}$ aryl, preferably $C_1$ to $C_8$ alkyl or $C_6$–$C_{12}$ aryl, $Li_2Se$, $Li_2Te$, $(NH_4)_2Se$ in a nonaqueous solvent such as THF, ethers, acetonitrile, propylene carbonate, DMF, molten sulfur, etc. The reaction which takes place is:

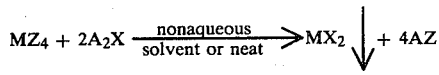

M = all Group IVb, Vb, VIb or VIIb transition metals or uranium; A = alkali metal, $NH_4^+$, $RR'R''NH^+$, or other cation as defined above; Z = convenient anion such as Cl, Br, I, acetate, carboxylate, nitrate, etc., as recited above; X = sulfur, selenium or tellurium.

Any convenient source of $M^{+2}$–$^{+5}$, preferably $M^{+5}$, most preferably $M^{+4}$ can be used. Complexes formed in solution which can be isolated as solids may be used as $M^{+4}$ source. In some cases (such as Nb and Ta) a pentavalent salt may be used directly because reduction of $M^{+5}$ to $M^{+4}$ occurs, for example:

The reaction is normally but not necessarily conducted in the absence of an excess of sulfide, selenide or telluride ion sources although other starting materials may be present in excess. Since particle size depends on the rate of mixing of reagents, the reaction may be allowed to proceed instantly, upon total admixture of one reagent to the reaction solution yielding fine products, or upon the measured addition of small increments of one reagent to the reaction solution, the reaction not achieving totality for several days.

As previously stated, the reagents may be mixed neat, i.e., no added solvent, when this is feasible, or may be diluted with solvent. The use of solvent, therefore, is not critical to the reaction; however, when a solvent is utilized, it must be nonaqueous.

The temperature of the reaction may range from +78° to 400° C., preferably ambient (25° C.) to 300° C. These temperatures are markedly lower than those needed when preparing dichalcogenides via solid state or gas phase methods wherein reaction temperatures up to and exceeding 1000° C. are commonplace.

The improved process utilizing the above enumerated catalyst prepared by the recited procedure may be used on a supported or unsupported form. When supports are used the materials may be deposited on the support by absorption of the metal sulfide from a homogeneous dispersion produced by reacting the reagents in certain solvents such as propylene carbonate, in the presence of the support, which supports are any typical inert or refractory oxide material, such as carbon, charcoal, alumina, silica, silica-alumina, MgO, CaO, the oxides of Groups IV-VI, especially $TiO_2$, $ZrO_2$, $ZrTiO_4$, etc. The most preferred supports, however, when one is used are MgO, CaO, alumina, silica-alumina and high surface area carbon.

EXAMPLE 1

Preparation of $TiS_2$ ($ZrS_2$, $HfS_2$ and $VS_2$)

The following example employs as a starting material $TiCl_4$. It was found that the procedure worked equally well for $ZrCl_4$, $HfCl_4$, $MoCl_4$ or $VCl_4$. A solution of 10 millimoles of $TiCl_4$ (1.9 g) in tetrahydrofuran (75 ml) was made up in a dry box ($TiCl_4$ is not stable in air or moisture). To this stirred solution at room temperature was added 0.96 g (20 millimoles) of lithium sulfide. The yellowish solution immediately began to darken. The reaction was allowed to proceed several hours although it was essentially complete within one hour. The resulting dark brown solid was filtered and washed with 10 ml THF. From the combined filtrates 83% of calculated ideal yield of lithium chloride was isolated after evaporation of the solvent. An elemental analysis of the dark brown powder remaining after drying revealed it to be $TiS_2$ containing one-half mole of solvent tetrahydrofuran and less than 5% by weight LiCl. Before catalytic evaluation the powders were heated at 400° C. in a stream of $H_2/H_2S$ for 1 hour, cooled, then washed with 12% acetic acid; then reheated in a $H_2/H_2S$ stream for one hour after which the chemical analysis showed only metal and sulfur with approximately 2:1 sulfur to metal ratio. The practice of the sulfiding step, however, is not essential to the successful practicing of the instant disclosed invention, it merely being an optional preferred step.

EXAMPLE 2

Preparation of $NbS_2$ ($TaS_2$)

This procedure is applicable to those transition metals of Group Vb and VIIb which form pentahalides (Nb and Ta and Re) and the example is given for niobium pentachloride:

To a solution of 10 millimoles of $NbCl_5$ (2.68 g) in 50 ml tetrahydrofuran was added 1.15 g lithium sulfide (25 millimoles) and the reaction stirred in the dry box overnight. The dark product obtained on filtration was shown to contain 60% by weight $NbS_{1.97}$. This sample was then treated as in previous example upon which the sample was close to 100% $NbS_{1.97}$.

EXAMPLE 3

Preparation of Molybdenum Disulfide

Addition of 10 millimoles of molybdenum tetrachloride and 20 millimoles of lithium sulfide to 30 ml THF with stirring results in a fine black solid which on filtration and drying contains 70% by weight/$MoS_2$. Most of the additional weight (60%) can be attributed to solvent which can be removed by heating to ca 150° C. and pumping (1 torr). As above examples, a $H_2/H_2S$, 12% acetic $H_2/H_2S$ treatment yielded a black powder.

EXAMPLE 4

$Li_2Se + ZrCl_4$, $ZrSe_2$

Into 50 ml acetonitrile, 10 millimoles zirconium tetrachloride is added and then, with stirring 20 millimoles of lithium selenide is added portionwise. After allowing to stir several hours, the solid product is collected on a filter and washed with acetonitrile and dried. Thus, 10 millimoles of zirconium diselenide is afforded.

EXAMPLE 5

Neat Preparation of Crystalline $TiS_2$ from $NH_3$, $H_2S$ and $TiCl_4$

Into a three-necked flask, a quantity of (approximately 5 grams) of $(NH_4)HS$ or $(NH_4)_2S$ was prepared by flowing in $NH_3$ gas and $H_2S$ gas. To the resulting white solid 3.8 gms of $TiCl_4$ (20 mmol) was added dropwise. A reaction immediately occurred yielding a black-brown solid, which was $TiS_2 + (NH_4)Cl$. This black-brown solid was removed from the flask and sealed in vacuum in a 20 mm diameter quartz tube which was 25 in. long. The tube was placed in a temperature gradient with one end at 380° C. and the other at 100° C. for one day. $(NH_4)Cl$ sublimed and condensed at the colder end thus effecting separation. At the hot end, the $TiS_2$ annealed yielding a perfect crystalline x-ray powder pattern.

EXAMPLE 6

$ReS_2$ From $ReCl_5$ by the Reaction $ReCl_5 + 2.5 Li_2S \rightarrow 5LiCl + \frac{1}{2}S° + ReS_2$ 3.64 gms of $KeCl_5$ were reacted with 2.30 gms of $Li_2S$ in 100 ml ethylacetate and allowed to stir. The black product as filtered and dried in $H_2S$ at 400° C. The product yielded an analysis for $ReS_{2.0}$.

|      | Theoretical | Measured |
|------|-------------|----------|
| % Re | 74.39       | 74.40    |
| % S  | 25.61       | 25.49    |

The X-ray product corresponded to $ReS_2$ and line broadening indicated a crystallite size of about 40×80 A. A BET surface area yielded 50.2 $m^2$/gm. Product before heat treatment was completely amorphous to X-rays indicating a crystalline order to less than 5 A, thus an amorphous solid.

EXAMPLE 7

$ReS_2$ From $ReCl_4$ by the Reaction $ReCl_4 + 2Li_2S \rightarrow ReS_2 + 4 LiCl$ In an exactly analogous manner to Example 6, $ReS_2$ was prepared from $ReCl_4$ with the same results except that excess sulfur did not have to be removed by washing or heating.

EXAMPLE 8

$ReS_2$ Dispersions 2.83 grams (8 mm) of $ReCl_5$ was added to 80 ml of propylene carbonate. To this was added 0.89 gms of $Li_2S$ (19 mm) and the solution was stirred for 4 hours yielding a black liquid which was 0.1 M in $ReS_2$ and could be continuously diluted to any concentration. This black liquid passed through normal filter discs and was stable.

EXAMPLE 9

$ReS_2$/MgO Composite

An 0.1 M dispersion of $ReS_2$ in propylene carbonate was prepared as in Example 8. 25 ml of this dispersion was contacted with 4 gms of MgO and stirred for 4 hours. The initially white solid was filtered and dried in $H_2S$ at 400° C. for 1 hour yielding a dark gray solid. The solid $ReS_2$/MgO composite was analyzed for $ReS_2$ yielding 2.33% Re. The amount of $ReS_2$ absorbed on the MgO can be controlled by varying the stir time and concentration.

EXAMPLE 10

Stable Homogeneous Dispersions

If the reactions $MoCl_4 + A_2S$ herein described wherein A is as previously defined, are carried out in appropriate media, stable homogeneous dispersions of $MoS_2$ in the liquid result (either accompanied or in the absence of the precipitated solid). Appropriate solvents include propylene carbonate, dimethylformamide (DMF), pyridine, acetonitrile, benzonitrile, propionitrile, 1,2 dimethoxyethane, diglyme, N-methylformamide. Use of these solvents results in the formation of homogeneous dispersions in the cases of all the Group IV through VII and uranium chalcogenides so far disclosed. For instance, if propylene carbonate (PC) is used as solvent, the supernatant phase will be a dark brown opaque dispersion which is unchanged on filtration (medium frit funnel) and which does not settle out over a period of weeks or months. Alternatively, if in addition to a nondispersing solvent (such as THF) a dispersing agent such as pyridine (or alkylamines) is initially present a similar dispersion will result. Murphy and Hull (J. Chem. Phys. 62 973 (1975)) have described dispersions of $TaS_2$ in aqueous media which are considerably less stable due to eventual decomposition of the sulfide by water (hydrolysis). In nonaqueous solutions such as those described in the instant invention such decomposition does not occur and stability remains for months.

The reaction of a solution of $TiCl_4$ in excessive trihexylamine and tetrahydrofuran with hydrogen sulfide provides another example of a means of dispersing the product $TiS_2$ in the media. The presense of the amine in the reaction media serves to disperse the extremely fine particles of the product they form. The chalcogenides formed in such dispersions may be absorbed on high surface area carbons, refractory oxides and high surface area basic or acidic solids such as CaO, MgO, $Al_2O_3$, silica-alumina, the solution clearing with time. Any other catalyst may be dispersed by substituting the appropriate metal halide ($MoCl_4$, $ReCl_4$, etc.).

As Hydrodesulfurization Catalysts

A. Materials of the formula $MX_y$ wherein M, X and y are as previously defined and which materials are prepared in accordance with the procedures outlined herein are superior hydrodesulfurization catalysts. The desulfurization of dibenzothiophene is an industry wide, accepted test of the HDS activity of various material. These materials desulfurize dibenzothiophene (DBT) at temperatures $\geq 300°$ C. and hydrogen pressure $\geq 250$ psi according to reaction (1) yielding biphenyl (BP) and cyclohexylbenzene (CHB):

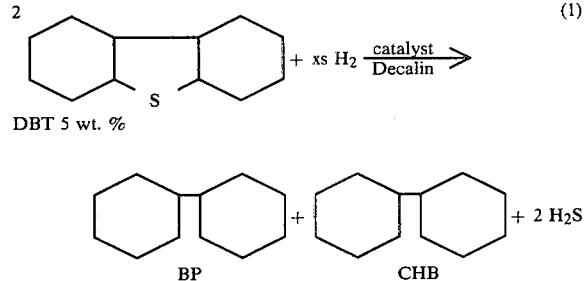

The amount of cyclohexylbenzene formed is used as a measure of the hydrogenation activity of the sulfide in a sulfur or $H_2S$ environment, for 2.0 hrs. at 25° C.–400° C.

The catalyst pretreatment entails exposure to 15% $H_2S/H_2$ (55 cc/min) for 2 hours at 25°–400° C. When appropriate the novel materials are compared to prior art binary sulfides and to commercial cobalt molybdate on $\gamma$-alumina, the hydrodesulfurization work-horse of the industry.

The rate constants for the desulfurization of dibenzothiophene for the unsupported materials were calculated (a) per gram of material; (b) per millimole of metal and are reported in Table I.

TABLE I

HYDRODESULFURIZATION ACTIVITY OF GROUP IVB-VIIB BINARY SULFIDES
Conditions: Carberry Reactor, 400° C., 450 psi, 10/20 mesh catalyst particles

| Catalyst | Activity r × $10^{16}$ molecules of DBT converted gm-sec | Activity r × $10^{15}$ molecules of DBT converted millimoles metal-sec |
|---|---|---|
| Group IVB | | |
| $TiS_2$ | 1.2 | 1.4 |
| $ZrS_2$ | 0.8 | 1.2 |
| Group VB | | |
| $VS_{2-x}$ | 1.0 | 1.1 |
| $NbS_2$ | 1.1 | 1.7 |
| $TaS_2$ | 0.4 | 1.1 |
| Group VIB | | |
| $Cr_2S_3$ | 4.8 | 4.8 |
| $MoS_2$ | 5.0 | 8.0 |
| $WS_2$ | 1.3 | 3.2 |
| Group VIIB | | |
| MnS | 0.7 | 0.6 |
| $ReS_2$ | 16.0 | 39.4 |

The rate constant per gram of catalyst for commercial cobalt-molybdate (Nalco-JCM 468) on $\gamma$-alumina under identical conditions is $67 \times 10^{16}$ molecules of dibenzothiophene converted/gm-sec.

The literature teaches that layered sulfides prepared according to prior art reactions (2) and (3):

$$M + 2S \longrightarrow MS_2 \quad (2)$$

$$M = \text{Group IV-VIIB}$$

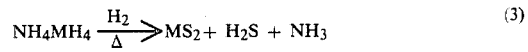

$$M = Mo, W$$

are catalytically active for desulfurization reactions. However, the materials prepared by reactions described in the preceding part of the patent application are more active per unit gram of material under the same conditions of temperature, pressure, catalyst mesh and quantity. The comparative data is summarized in Table II. Materials 2 and 5 are prepared via the nonaqueous precipitation technique described herein while materials 1, 3 and 4 are prepared by typical prior art techniques: clearly, the nonaqueous precipitation technique yields superior catalysts.

TABLE II

EFFECT OF PREPARATION ON HYDRODESULFURIZATION ACTIVITY
Conditions: Carberry Reactor, 400° C., 450 psi, 10/20 mesh

| Material | Method of Preparation | Activity r × $10^{15}$ molecules of DBT converted gm-sec |
|---|---|---|
| (1) $NbS_2$ | Nb + S; Rxn 2 | 11 |
| (2) $NbS_2$ | Nonaqueous precipitation | 17 |
| (3) $MoS_2$ | $NH_4MoS_4$; Rxn 3 | 22 |
| (4) $MoS_2$ | $MoO_3 \xrightarrow{15\% H_2S / H_2}$ + 25–400° C. 90 min (4928-42) 400° 30 min | |
| (5) $MoS_2$ | Nonaqueous precipitation | 50 |

+ 10/40 mesh, conversion to $MoS_2$ not completed.

B. $ReS_y$ (wherein y is about 1.5 to about 4) materials prepared by the nonaqueous precipitation technique described in detail above are superior HDS type catalysts compared to $RES_y$ materials prepared by prior art technique. This can be seen from Tables III and IV wherein $ReS_y$ type materials are compared for their activity/gram for the conversion of dibenzothiophene (DBT). In Table III, materials 1 and 2 are prepared by the nonaqueous precipitation technique described herein while material 3 is prepared by a typical prior art technique. Clearly, the nonaqueous precipitation materials are superior.

TABLE III

EFFECT OF PREPARATION ON HYDRODESULFURIZATION ACTIVITY
Conditions: Carberry Reactor, 400° C., 450 psi, 20/40 mesh

| Catalyst | Method of Preparation | Activity r × $10^{16}$ molecules of DBT converted gm-sec |
|---|---|---|
| (1) $ReS_2$—$ReS_{2-x}$ | Nonaqueous Precipitation from $ReCl_5$ + $Li_2S$ | 50.3 |
| (2) $ReS_2$—$ReS_{2-x}$ | Nonaqueous Precipitation from $ReCl_4$ + $Li_2S$ | 164 |
| (3) $ReS_2$ | $Re(m) + S(s) \xrightarrow{\Delta}{P}$ From the elements | 4.7 |

In Table IV, the $ReS_y$ type materials are compared for their activity/gm for the desulfurization of dibenzothiophene (DBT) to biphenyl (BP) and their hydrogenation activity as reflected in cyclohexylbenzene reaction rates. Materials 1, 2 and 3 are prepared by the nonaqueous precipitation while material 4 is prepared by a typical prior art technique. The nonaqueous precipitation materials are again clearly superior HDS and hydrogenation catalysts; indeed their activity per gram is superior to a commercial cobalt molybdate on γ-alumina catalyst (CMA) material.

TABLE IV

COMPARISON OF CATALYSTS FOR HYDRODESULFURIZATION AND HYDROGENATION ACTIVITY
Conditions: Carberry Reactor, 350° C., 450 psi, 20/40 mesh

| Catalyst | Method of Preparation | Activity r × $10^{16}$ Molecules of DBT → X gm-sec | | |
|---|---|---|---|---|
| | | x = BP | CHB | Total |
| (1) $ReS_2$—$ReS_{2-x}$ | Nonaqueous precipitation from $ReCl_5$ + $Li_2S$ | 13.0 | Non-detected | 13.0 |
| (2) $ReS_2$—$ReS_{2-x}$ | Nonaqueous precipitation from $ReCl_4$ + $Li_2S$ | 63 | 8 | 71 |
| (3) $ReS_2$—$ReS_{2-x}$ | Nonaqueous precipitation from $ReCl_3$ + $Li_2S$ | 2 | Non-detected | 2 |
| (4) $Re_2S_7$ | Prior art preparation technique $NH_4ReO_4 \xrightarrow[25-400° C.]{15\% H_2S/H_2}$ 90 min | 3 | Non-detected | 3 |
| (5) CMA | Commercial | 51 | 6 | 57 |

C. $RoS_2$ supported on refractory oxides and high surface area basic or acidic solids such as MgO, CaO, γ-$Al_2O_3$ according to the following procedure, reaction (5) are active hydrodesulfurization catalysts for resid-like organosulfur molecules (i.e. dibenzothiophene):

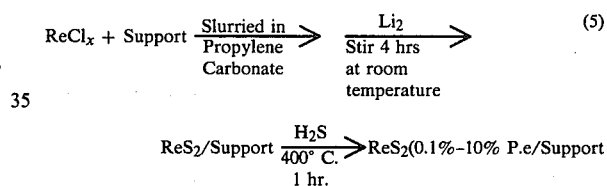

$$ReS_2/\text{Support} \xrightarrow[1 \text{ hr.}]{H_2S \; 400° C.} ReS_2(0.1\%-10\% \text{ P.e/Support})$$

In Table V, the hydrodesulfurization activity of $ReS_2$ supported catalysts prepared by the nonaqueous dispersion technique on various acidic and basic supports described herein are compared with supported rhenium catalysts prepared by typical prior art techniques. The catalysts are compared in two ways: (a) activity/gram and (b) activity/millimole of metal.

In general, when utilizing a Group IVb to Group VIIb or uranium chalcogenide in the supported state the metal chalcogenide will be present at from 0.01 to 30 wt % Group IVb to Group VIIb or uranium metal based on total catalyst, preferably from 0.1 to 10 wt. % Group IVb to Group VIIb or uranium metal based on total catalyst.

TABLE V

EFFECT OF PREPARATION ON THE HYDRODESULFURIZATION ACTIVITY OF SUPPORTED RHENIUM SULFIDE CATALYSTS
Conditions: Carberry Reactor, 350° C., 450 psi, 20/40 mesh

| Catalyst | Method of Preparation | Activity r × $10^{16}$ molecules of DBT → X gm-sec | | | Activity r × $10^{16}$ molecules DBT → X gm millimoles Re | | |
|---|---|---|---|---|---|---|---|
| | | x = BP | CHB | Total | BP | CHB | Total |
| (1) $ReS_2$/MgO (2% Re) | Nonaqueous dispersion from $ReCl_5$ + $Li_2S$ | 9.4 | — | 9.4 | 88 | — | 88 |
| (2) $ReS_2$/MgO (0.6% Re) | Nonaqueous dispersion from $ReCl_4$ + $Li_2S$ | 2.8 | — | 2.8 | 86 | — | 86 |
| (3) $ReS_2$/γ$Al_2O_3$ (1.64% Re) | Nonaqueous dispersion from $ReCl_5$ + $Li_2S$ | 7.4 | — | 7.4 | 84 | — | 84 |
| (4) $ReS_2$/γ$Al_2O_3$ | $NH_4ReO_4$ (aqueous impreg- | 11 | 0.6 | 11.6 | 110 | 6 | 116 |

TABLE V-continued
EFFECT OF PREPARATION ON THE HYDRODESULFURIZATION ACTIVITY OF SUPPORTED RHENIUM SULFIDE CATALYSTS
Conditions: Carberry Reactor, 350° C., 450 psi, 20/40 mesh

| Catalyst | Method of Preparation | Activity r × 10$^{16}$ molecules of DBT → X gm-sec | | | Activity r × 10$^{16}$ molecules DBT → X gm millimoles Re | | |
|---|---|---|---|---|---|---|---|
| | | x = BP | CHB | Total | BP | CHB | Total |
| (1.91% Re) | nation) Dry Vacuum 700° C.) Presulfide 15% H$_2$S/H$_2$, 25–400° C., 2 hrs. | | | | | | |
| (5) ReS$_2$/γAl$_2$O$_3$ (1.91% Re) | NH$_4$ReO$_4$ (Aqueous impregnation) Dry, Calcine 3 hrs, 450° C. air, Presulfide | 8.4 | — | 8.4 | 84 | — | 84 |
| (6) ReS$_2$/MgO (2.05% Re) | Same as 4 | 4.2 | — | 4.2 | 37.7 | — | 37.7 |
| (7) ReS$_2$/MgO (2.05% Re) | Same as 5 | 2.1 | — | 2.1 | 21 | — | 21 |

An activity comparison of the γ-Al$_2$O$_3$ supported rhenium catalysts indicates that the nonaqueous dispersion material, compound 3, displays comparable activity to prior art material 5. Material 4 however, displays the best activity of the alumina supported catalysts. The activity of this material was increased considerably by the elimination of the calcination step. Consequently prior art techniques in which calcination at elevated temperatures in air are routine yield inferior catalytic materials for hydrodesulfurization.

The activity advantage of the nonaqueous dispersion preparation over aqueous methods is more dramatic when the desired support is MgO. In this case, the activity is two to four times higher than prior art materials; material 1 is 2.2–4.5 times more active per gram and per millimole of rhenium than materials 6 and 7 respectively.

In Table VI, the hydrosulfurization activity of ReS$_2$ (2.1% Re)/MgO is presented and compared to cobalt-moly/γ-Al$_2$O$_3$, CMA (JCM-468, RT-2) at 400° C. and 450 psig, H$_2$ flow ~100 cc/min.

Table VI indicates that under comparable conditions but with lower metal loading and less catalyst, ReS$_2$ (2.1% Re)/MgO is approximately as active as CMA at a space velocity equal to 1 V/V/H. However, ReS$_2$/MgO is much more selective toward desulfurization as evidenced by the selectivity factors. Consequently, under conditions necessary to desulfurize resid, i.e. T=400° C., P≧450 psig, SV=0.5–1 V/V/H, ReS$_2$/MgO is as active (on mole % conversion basis) as CMA but is far more selective; thus the preferred catalyst.

TABLE VI

| Catalyst | cc (gm) | % M | SV (V/V/H) | Hours on Stream | Mole % x$^1$ | | | S$^2$ (Selectivity) |
|---|---|---|---|---|---|---|---|---|
| | | | | | BP | CHB | T | |
| CMA | 5 | 10 | 2 | 165 | 62.8 | 37.1 | 99.9 | 0.63 |
| | (3.91) | | 0.7 | 213 | 43.9 | 55.6 | 99.5 | 0.44 |
| ReS$_2$/MgO | 2.5 | 2.1 | 2–2.2 | 160 | 71 | 4.3 | 75.3 | 0.94 |
| | (1.74) | | 0.4–1 | 212 | 85 | 6 | 91 | 0.93 |

1

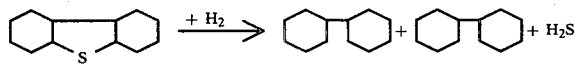

DBT          BP        CHB

2

$$S = \frac{\text{mole \% } x_{BP}}{23 \text{ mole \% } x_{BP} + \text{mole \% } x_{CHB}}$$

What is claimed is:

1. In a process for the hydrodesulfurization of hydrocarbon feed streams wherein said hydrocarbon feedstreams are contacted with a catalyst at a temperature and pressure and in the presence of hydrogen or a hydrogen donor solvent and under conditions sufficient to effect the hydrodesulfurization of the hydrocarbon feedstream, the improvement comprising using as the catalyst a layered material of the formula MX$_y$ wherein M is a transition metal selected from the groups consisting of Group IVb, Vb, VIb, VIIb metals, X is a chalcogen selected from the group consisting of sulfur, selenium, tellurium and mixtures thereof and y is a number ranging from about 1.5 to about 3 which material is prepared by reacting neat a Group IVb to VIIb metal salt, with a source of sulfide, selenide, or telluride ions, said source being selected from the group consisting of Li$_2$X, Na$_2$X, K$_2$X, NaHX, LiHX, KHX, (NH$_4$)HX, (NH$_4$)$_2$X, (RNH$_3$)$_2$X, (RR'NH$_2$)$_2$X, (RR'R''NH)$_2$X wherein R, R' and R'' are the same or different C$_1$–C$_{20}$ alkyl group and C$_6$–C$_{20}$ aryl group, and X is the chalcogen selected from the group consisting of sulfur, selenium, tellurium and mixtures thereof, said reaction being conducted at a temperature of from −78° to 400° C. for a time sufficient for reaction to occur.

2. The process of claim 1 wherein the catalyst is ReS$_y$ wherein y is from about 2 to about 4.

3. The process of claim 2 wherein the catalyst is ReS$_2$.

4. The process of claim 1 further characterized by the catalyst being deposited on high surface area supports selected from the group consisting of high surface area carbon and high surface area refractory oxides.

5. The process of claim 1 wherein the chalcogen is sulfur.

6. The process of claim 5 is about 2.

7. The process of claim 1 wherein the transition metal is selected from Group VIb.

8. The process of claim 4 wherein the high surface area support is selected from the group consisting of CaO, MgO, $Al_2O_3$, silica-alumina and high surface area carbon.

9. The process of claim 1 wherein the catalyst preparation temperature ranges from 25° to 300° C.

10. In a process for the hydrodenitrogenation of hydrocarbon feedstreams wherein said hydrocarbon feedstreams are contacted with a catalyst at a temperature and pressure and in the presence of hydrogen or a hydrogen donor solvent and under conditions sufficient to effect the hydrodenitrogenation of the hydrocarbon feedstream, the improvement comprising using as the catalyst a layered material of the formula $MX_y$ wherein M is a transition metal selected from the group consisting of Group IVb, Vb, VIb, and VIIb transition metals, X is a chalcogen selected from the group consisting of sulfur, selenium, tellurium and mixtures thereof and y is a number ranging from about 1.5 to about 3 which material is prepared by reacting neat a Group IVb to VIIb metal salt with a source of sulfide, selenide or telluride ions, said source being selected from the group consisting of $Li_2X$, $Na_2X$, $K_2X$, NaHX, LiHX, KHX, $(NH_4)HX$, $(NH_4)_2X$, $(RNH_3)_2X$, $(RR'NH_2)_2X$, $(RR'R''NH)_2X$ wherein R, R' and R'' are the same or different $C_1$–$C_{20}$ alkyl group and $C_6$–$C_{20}$ aryl group and X is the chalcogen selected from the group consisting of sulfur, selenium, tellurium and mixtures thereof, said reaction being conducted at a temperature of from $-78°$ to 400° C. for a time sufficient for reaction to occur.

11. The process of claim 10 wherein the transition metal is selected from the group consisting of Group VIb transition metals.

12. The process of claim 10 wherein the chalcogen is sulfur.

13. The process of claim 11 wherein the chalcogen is sulfur.

14. The process of claim 12 wherein y is 2.

15. The process of claim 13 wherein y is about 2.

16. The process of claim 10 wherein the catalyst is $ReS_y$ wherein y is from about 2 to 3.

17. The process of claim 10 wherein the catalyst is $ReS_2$.

18. The process of claim 10 wherein the catalyst preparation temperature ranges from 25° to 300° C.

19. The process of claim 17 wherein the catalyst preparation temperature ranges from 25° to 300° C.

20. The process of claim 10 further characterized by the catalyst being deposited on high surface area supports selected from the group consisting of high surface area carbon and high surface area refractory oxides.

21. The process of claim 20 wherein the high surface area support is selected from the group consisting of CaO, MgO, $Al_2O_3$, silica-alumina and high surface area carbon.

22. In a process for the hydrodesulfurization of hydrocarbon feedstreams wherein said hydrocarbon feedstreams are contacted with a catalyst at a temperature and pressure and in the presence of hydrogen or a hydrogen donor solvent and under conditions sufficient to effect the hydrodesulfurization of the hydrocarbon feedstream, the improvement comprising using as the catalyst a layered material of the formula $MX_y$ wherein M is a transition metal selected from the group consisting of Group IVb, Vb, VIb, VIIb metals, X is a chalcogen selected from the group consisting of sulfur, selenium, tellurium, and mixtures thereof and y is a number ranging from about 1.5 to about 3 which material is prepared by reacting in the presence of a nonaqueous, aprotic solvent a Group IVb to VIIb metal salt, with a source of sulfide, selenide, or telluride ions, said source being selected from the group consisting of $Li_2X$, $Na_2X$, $K_2X$, NaHX, LiHX, KHX, $(NH_4)HX$, $(NH_4)_2X$, $(RNH_3)_2X$, $(RR'NH_2)_2X$, $(RR'R''NH)_2X$, wherein R, R' and R'' are the same or different $C_1$–$C_{20}$ alkyl group and $C_6$–$C_{20}$ aryl group and X is the chalcogen selected from the group consisting of sulfur, selenium, tellurium and mixtures thereof, said reaction being conducted at a temperature of from $-78°$ to 400° C. for a time sufficient for reaction to occur.

23. The process of claim 22 wherein the chalcogen is sulfur.

24. The process of claim 23 wherein y is about 2.

25. The process of claim 22 wherein the transition metal is selected from the group consisting of Group VIb transition metals.

26. The process of claim 25 wherein the chalcogen is sulfur.

27. The process of claim 26 wherein y is about 2.

28. The process of claim 22 wherein the catalyst is $ReS_y$ wherein y is from about 2 to about 4.

29. The process of claim 28 wherein the catalyst is $ReS_2$.

30. The process of claim 22 further characterized by the catalyst being deposited on high surface area supports selected from the group consisting of high surface area carbon and high surface area refractory oxides.

31. The process of claim 29 further characterized by the catalyst being deposited on high surface area supports selected from the group consisting of high surface area carbon and high surface refractory oxides.

32. The process of claim 30 wherein the high surface area support is selected from the group consisting of CaO, MgO, $Al_2O_3$, silica-alumina and high surface area carbon.

33. The process of claim 31 wherein the high surface area support is selected from the group consisting of CaO, MgO, $Al_2O_3$, silica-alumina and high surface area carbon.

34. The process of claim 22 wherein the catalyst preparation temperature ranges from 25° to 300° C.

35. The process of claim 29 wherein the catalyst preparation temperature ranges from 25° to 300° C.

36. The process of claim 29 wherein the nonaqueous, aprotic solvent is selected from the group consisting of acetonitrile, benzonitrile, propionitrile, acetone, $C_1$–$C_{20}$ alkyl halides, $C_6$–$C_{20}$ aryl halides, 1, 2-dimethoxyethane, diglyme, N-methylformamide, dimethylformamide, $C_6$–$C_{20}$ aromatics, pyridine, $C_1$–$C_{12}$ alkanes, $C_4$–$C_8$ ethers, anhydrous acids, propylene carbonate and the hydrocarbon feedstream to be catalytically treated.

37. The process of claim 29 wherein the catalyst is prepared in a catalytic reactor chamber by the addition of the appropriate starting material, the hydrocarbon feedstream to be catalytically treated being the nonaqueous solvent.

38. In a process for the hydrodenitrogenation of hydrocarbon feedstreams wherein said hydrocarbon feedstreams are contacted with a catalyst at a temperature and pressure and in the presence of hydrogen or a hydrogen donor solvent and under conditions sufficient to effect the hydrodenitrogenation of the hydrocarbon feedstream, the improvement comprising using as the catalyst a layered material of the formula $MX_y$ wherein M is a transition metal selected from the group consisting of Group IVb, Vb, VIb, and VIIb metals, X is a chalcogen selected from the group consisting of sulfur, selenium, tellurium and mixtures thereof and y is a number ranging from about 1.5 to about 3 which material is prepared by reacting in the presence of a nonaqueous, aprotic solvent a Group IVb to VIIb metal salt with a source of sulfide, selenide or telluride ions, said source being selected from the group consisting of $Li_2X$, $Na_2X$, $K_2X$, NaHX, LiHX, KHX, $(NH_4)HX$, $(NH_4)_2X$, $(RNH_3)_2X$, $(RR'NH_2)_2X$, $(RR'R''NH)_2X$ wherein R, R' and R'' are the same or different $C_1$–$C_{20}$ alkyl group and $C_6$–$C_{20}$ aryl group, and X is the chalcogen selected from the group consisting of sulfur, selenium, tellurium and mixtures thereof, said reacting being conducted at a temperature of from $-78°$ to $400°$ C. for a time sufficient for reaction to occur.

39. The process of claim 38 wherein the transition metal is selected from the group consisting of Group VIb transition metals.

40. The process of claim 38 wherein the chalcogen is sulfur.

41. The process of claim 39 wherein the chalcogen is sulfur.

42. The process of claim 40 wherein y is about 2.

43. The process of claim 41 wherein y is about 2.

44. The process of claim 38 wherein the catalyst is $ReS_y$ wherein y is from about 2 to about 3.

45. The process of claim 44 wherein the catalyst is $ReS_2$.

46. The process of claim 38 further characterized by the catalyst being deposited on high surface area supports selected from the group consisting of high surface area carbon and high surface area refractory oxides.

47. The process of claim 45 further characterized by the catalyst being deposited on high surface area supports selected from the group consisting of high surface area carbon and high surface area refractory oxides.

48. The process of claim 46 wherein the high surface area support is selected from the group consisting of CaO, MgO, $Al_2O_3$, silica-alumina and high surface area carbon.

49. The process of claim 47 wherein the high surface area support is selected from the group consisting of CaO, MgO, $Al_2O_3$, silica-alumina and high surface area carbon.

50. The process of claim 38 wherein the catalyst preparation temperature ranges from $25°$ to $300°$ C.

51. The process of claim 45 wherein the catalyst preparation temperature ranges from $25°$ to $300°$ C.

52. The process of claim 38 wherein the non-aqueous, aprotic solvent is selected from the group consisting of acetonitrile, benzonitrile, propionitrile, acetone, $C_1$–$C_{20}$ alkyl halides, $C_6$–$C_{20}$ aryl halides, 1,2-dimethoxyethane, diglyme, N-methylformamide, dimethylformamide, $C_6$–$C_{20}$ aromatics, pyridine, $C_1$–$C_{12}$ alkanes, $C_4$–$C_8$ ethers, anhydrous acids, propylene carbonate, ammonia, molten sulfur, $C_1$–$C_{30}$ amine and the hydrocarbon feedstream to be catalytically treated.

53. The process of claim 45 wherein the nonaqueous, aprotic solvent is selected from the group consisting of acetonitrile, benzonitrile, propionitrile, acetone, $C_1$–$C_{20}$ alkyl halides, $C_6$–$C_{20}$ aryl halides, 1,2-dimethoxyethane, diglyme, N-methylformamide, dimethylformamide, $C_6$–$C_{20}$ aromatics, pyridine, $C_1$–$C_{12}$ alkanes, $C_4$–$C_8$ ethers, anhydrous acids, propylene carbonate, ammonia, molten sulfur, $C_1$–$C_{30}$ amines and the hydrocarbon feedstock to be catalytically treated.

54. The process of claim 38 wherein the catalyst is prepared in a catalytic reactor chamber by the addition of the appropriate starting material, the hydrocarbon feedstream to be catalytically treated being the nonaqueous solvent.

55. The process of claim 45 wherein the catalyst is prepared in a catalytic reaction chamber by the addition of the appropriate starting material, the hydrocarbon feedstream to be catalytically treated being the nonaqueous solvent.

56. In a process for the hydrogenation in the presence of hydrogen or a hydrogen donor solvent of hydrocarbon feedstreams wherein said hydrocarbon feedstreams are contacted with a catalyst at a temperature and pressure and under conditions sufficient to effect the hydrogenation of the hydrocarbon feedstream, the improvement comprising using as a catalyst a layered material of the formula $MX_y$ wherein M is a transition metal selected from the group consisting of Group IVb,Vb, VIb,VIIb metals, X is a chalcogen selected from the group consisting of sulfur, selenium, tellurium and mixtures thereof and y is a number ranging from about 1.5 to about 3 which material is prepared by reacting in the presence of a nonaqueous, aprotic solvent a Group IVb to VIIb metal salt, with a source of sulfide, selenide, or telluride ions, said source being selected from the group consisting of $Li_2X$, $Na_2X$, $K_2X$, NaHX, LiHX, KHX, $(NH_4)HX$, $(NH_4)_2X$, $(RNH_3)_2X$, $(RR'NH_2)_2X$, $(RR'R''NH)_2X$ wherein R, R' and R'' are the same or different $C_1$–$C_{20}$ alkyl group and $C_6$–$C_{20}$ aryl group, and X is the chalcogen selected from the group consisting of sulfur, selenium, tellurium and mixtures thereof, said reaction being conducted at a temperature of from $-78°$ to $400°$ C. for a time sufficient for reaction to occur.

57. The process of claim 56 wherein the transition metal is selected from the group consisting of Group VIb and Group VIIb transition metals.

58. The process of claim 56 wherein the chalcogen is sulfur.

59. The process of claim 57 wherein the chalcogen is sulfur.

60. The process of claim 58 wherein y is about 2.

61. The process of claim 59 wherein y is about 2.

62. The process of claim 56 wherein the catalyst is $ReS_y$ wherein y is from about 2 to about 3.

63. The process of claim 62 wherein the catalyst is $ReS_2$.

64. The process of claim 56 further characterized by the catalyst being deposited on high surface area supports selected from the group consisting of high surface area carbon and high surface area refractory oxides.

65. The process of claim 63 further characterized by the catalyst being deposited on high surface area supports selected from the group consisting of high surface area carbon and high surface area refractory oxides.

66. The process of claim 64 wherein the high surface area support is selected from the group consisting of CaO, MgO, $Al_2O_3$, silica-alumina and high surface area carbon.

67. The process of claim 65 wherein the high surface area support is selected from the group consisting of CaO, MgO, $Al_2O_3$, silica-alumina and high surface area carbon.

68. The process of claim 56 wherein the catalyst preparation temperature ranges from $25°$ to $300°$ C.

69. The process of claim 63 wherein the catalyst preparation temperature ranges from $25°$ to $300°$ C.

70. The process of claim 56 wherein the nonaqueous aprotic solvent is selected from the group consisting of acetonitrile, benzonitrile, propionitrile, acetone, $C_1$–$C_{20}$ alkyl halides, $C_6$–$C_{20}$ aryl halides, 1,2-dimethoxyethane, diglyme, N-methylformamide, dimethylformamide, $C_6$–$C_{20}$ aromatics, pyridine, $C_4$–$C_8$ ethers, anhydrous acids, propylene carbonate, ammonia, molten sulfur, $C_1$–$C_{30}$ amines, $C_1$–$C_{12}$ alkanes, and the hydrocarbon feedstream to be catalytically treated.

71. The process of claim 63 wherein the nonaqueous aprotic solvent is selected from the group consisting of acetonitrile, benzonitrile, propionitrile, acetone, $C_7$–$C_{20}$ alkyl halides, 1,2-dimethoxyethane, diglyme, N-methylformamide, dimethylformamide, $C_6$–$C_{20}$ aromatics, pyridine, $C_4$–$C_8$ ethers, anhydrous acids, propylene carbonate, ammonia, molten sulfur, $C_1$–$C_{30}$ amines, $C_1$–$C_{12}$ alkanes and the hydrocarbon feedstream to be catalytically treated.

72. The process of claim 56 wherein the catalyst is prepared in a catalytic reactor chamber by the addition of the appropriate starting material, the hydrocarbon feedstream to be catalytically treated being the nonaqueous solvent.

73. The process of claim 63 wherein the catalyst is prepared in a catalytic reactor chamber by the addition of the appropriate starting material, the hydrocarbon feedstream to be catalytically treated being the nonaqueous solvent.

74. The process of claim 22 wherein the non-aqueous, aprotic solvent is selected from the group consisting of acetonitrile, benzonitrile, propionitrile, acetone, $C_1$–$C_{20}$ alkyl halides, $C_6$–$C_{20}$ aryl halides, 1,2-dimethoxyethane, diglyma, N-methylformamide, dimethylformamide, $C_6$–$C_{20}$ aromatics, pyridine, $C_1$–$C_{12}$ alkanes, $C_4$–$C_8$ ethers, anhydrous acids, propylene carbonate and the hydrocarbon feed stream to be catalytically treated.

75. The process of claim 22 wherein the catalyst is prepared in a catalytic reactor chamber by the addition of the appropriate starting material, the hydrocarbon feed stream to be catalytically treated being the non-aqueous solvent.

76. The process of claim 17 further characterized by the catalyst being deposited on high surface area supports selected from the group consisting of high surface area carbon and high surface area refractory oxides.

77. The process of claim 76 wherein the high surface area support is selected from the group consisting of CaO, MgO, $Al_2O_3$, silica-alumina and high surface area carbon.

78. In a process for the hydrogenation of hydrocarbon feedstreams wherein said hydrocarbon feedstreams are contacted with a catalyst at a temperature and pressure and in the presence of hydrogen or a hydrogen donor solvent and under conditions sufficient to effect the hydrogenation of the hydrocarbon feedstreams, the improvement comprising using as the catalyst a layered material of the formula $MX_y$ wherein M is a transition metal selected from the group consisting of Group IVb, Vb, VIb, VIIb metals X is a chalcogen selected from the group consisting of sulfur, selenium, tellurium and mixtures thereof and y is a number ranging from about 1.5 to about 3 which material is prepared by reacting neat a Group IVb to VIIb metal salt, with a source of sulfide, selenide, or telluride ions, said source being selected from the group consisting of $Li_2X$, $Na_2X$, $K_2X$, NaHX, LiHX, KHX, $(NH_4)HX$, $(NH_4)_2X$, $(RNH_3)_2X$, $(RR'NH_2)_2X$, $(RR'R''NH)_2X$ wherein R, R' and R'' are the same or different $C_1$–$C_{20}$ alkyl group and $C_6$–$C_{20}$ aryl group and X is the chalcogen selected from the group consisting of sulfur, selenium, tellurium and mixtures thereof, said reaction being conducted at a temperature of from $-78$ to $400°$ C. for a time sufficient for reaction to occur.

79. The process of claim 78 wherein the transition metal is selected from the group consisting of Group VIb transition metals.

80. The process of claim 78 wherein the chalcogen is sulfur.

81. The process of claim 80 wherein y is about 2.

82. The process of claim 79 wherein the chalcogen is sulfur.

83. The process of claim 82 wherein y is about 2.

84. The process of claim 78 wherein the catalyst is $ReS_y$ wherein y is from about 2 to about 3.

85. The process of claim 84 wherein the catalyst is $ReS_2$.

* * * * *